United States Patent Office 3,809,780
Patented May 7, 1974

3,809,780
PREPARATION OF A SEASONING AGENT
Kengo Ishida, Masanobu Kawai, and Noboru Mukai, Tokyo, Japan, assignors to Kyowa Hakko Kogyo Co., Ltd., Chiyoda-ku, Tokyo, Japan
No Drawing. Continuation of abandoned application Ser. No. 4,107, Jan. 19, 1970. This application Apr. 27, 1972, Ser. No. 248,333
Claims priority, application Japan, Feb. 8, 1969, 44/9,004
Int. Cl. A23l 1/22; C07g 7/02
U.S. Cl. 426—60                                          7 Claims

ABSTRACT OF THE DISCLOSURE

A seasoning agent having a meat-like flavor is produced by the steps of subjecting yeast to decomposition by cell lytic enzymes produced by organisms of the genera Coprinus, Daedaleopsis or Irpex to produce a decomposition liquor, filtering the decomposition liquor to produce a filtrate, adjusting the pH of the filtrate to 5 to 6.5 and heating the filtrate at 40 to 85° C. to produce the seasoning agent.

---

This is a continuation of application Ser. No. 4,107, filed Jan. 19, 1970, now abandoned.

BACKGROUND OF THE INVENTION

This invention relates to a method for preparing a yeast extract having a harmonized taste and flavor by allowing a novel cell lytic enzyme to react with a yeast.

Recently, meat extracts, yeast extracts, etc. which can develop natural taste and flavor, have been widely utilized in place of chemical seasoning agents such as sodium glutamate, sodium 5'-inosinate, sodium 5'-guanylate, sodium succinate, etc., which lack natural flavors and tastes.

Yeast extract has previously been prepared from cultured yeast as a raw material by (1) an extraction method, (2) a protease decomposition method, (3) an acid decomposition method, and (4) an autolysis method, but none of these conventional methods is completely satisfactory because each has a number of deficiencies. For example, in methods (1) and (2), the yield is low and a bitter taste develops; in method (3) an undesirable smell of acid decomposition is generated and useful components may be broken down; and in method (4) the control of the process is difficult and the method cannot be applied to heat-dried yeast cells.

From the stand-point of improving the status of such conventional methods, the present inventors have made various studies of eliminating these deficiencies and preparing a yeast extract of good quality in a high yield, and as a result, have found that yeast extract which can sufficiently meet the desired object can be obtained by allowing a novel cell lytic enzyme previously discovered by the present inventors and described in Japanese patent application No. 44608/68 (U.S. application Ser. No. 828,316 filed May 27, 1969) to react with yeasts or material containing yeasts.

The present invention has been accomplished on the basis of said finding, and an object of the present invention is to obtain a yeast extract having a harmonized taste and flavor by allowing a strong cell lytic enzyme, which is formed by strains of organisms belonging to the genera Coprinus, Daedaleopsis, and Irpex, and which has strong glucanase, and protease activities and the ability characteristically to decompose and solubilize yeast cells in a short period of time, to react with yeast cells or materials containing yeast cells, thereby decomposing the cell walls as well as decomposing and solubilizing protein in the cells thereby to form sugars, amino acids, peptides, etc., and then concentrating or pulverizing the solubilized components.

The cell lytic enzymes used in the present invention can be obtained by culturing in a solid medium or a liquid medium strains belonging to the genus Coprinus, such as *Coprinus macrorhizus* f. *microsporus, Coprinus radians, Coprinus micaceus,* etc. or strains belonging to the genus Daedaleopsis, such as *Daedaleopsis styracina, Daedaleopsis confragosa, Daedaleopsis tricolor, Daedaleopsis nipponica,* etc., or further *Irpex lacteus* belonging to the genus Irpex. It is necessary that a carbon source, a nitrogen source and other necessary components for growth of said microorganisms, which can be utilized by said microorganisms, are contained in the medium. That is, as a carbon source, sucrose, starch, lactose, maltose, dextrose, etc. can be used. As a nitrogen source, distillers solubles, peptone, meat extract, yeast, soybean cake, gluten, amino acids, ammonium salts, nitrates, urea, etc. can be used. In addition, magnesium salts, potassium salts, sodium salts, phosphates, etc. or zinc, manganese, iron, cobalt, etc. as trace elements, can be used, if desired.

The cell lytic enzyme is generally prepared from an enzyme solution obtained by removing cells from a fermentation liquor according to conventional enzyme purification methods such as organic solvent precipitation, salting out, concentration under reduced pressure, adsorption and desorption by ion exchange. However, the cells, culture filtrate, etc. after the culturing in said medium, can also be used as an enzyme source without further treatment.

The raw material yeast used in the present invention includes all available yeasts such as bakers yeast cultured according to conventional methods, sulfite pulp yeast cultured in a sulfite pulp waste liquor, the so-called petroleum yeast cultured in a hydrocarbon medium such as normal paraffin, alcohol waste liquor yeast separated from the alcohol fermentation waste liquor, etc. These yeasts can be used in a dried state after culturing and separation, or in the form of compressed yeast, or the culture liquor can be employed without further treatment. The decomposition efficiency of the cell lytic enzyme is generally increased when cells killed by heat treatment are used, but the living cells can also be used without any problem.

The yeast concentration, amount of enzyme added, reaction temperature, reaction time, reaction pH, etc. for preparing the yeast extract depend upon the kind of enzyme used and a sampling method of an enzyme source. Thus, it is necessary to select those which meet the conditions for each case. For example, in the case where the enzyme obtained from the strains belonging to the genus Coprinus such as *Coprinus macrorhizus* f. *microsporus, Coprinus radians,* etc. is used, the optimum conditions include use of a suspension of cells whose yeast concentration is 5–25%, pH adjusted to 8–8.5 with caustic soda and sodium secondary phosphate, 0.02–1.5% of enzyme added thereto on the basis of dry raw material yeast, and decomposition carried out at 50–55° C. for 5–48 hours with stirring. When the enzyme obtained from the strains belonging to the genus Daedaleopsis or Irpex such as *Daedaleopsis styracina, Irpex lacteus,* etc. is used, it is preferred that 0.02–2% of enzyme is added to the suspension of yeast cells at a 5–25% concentration and enzymatic decomposition is carried out at a pH of 2.5–3.0 and 45–50° C. for 5–48 hours.

These decomposition reactions are not generally troubled by putrefaction, because the temperature is generally high, but ethyl acetate, alcohols, etc. can be added and used as preservatives, if necessary.

By the decomposition reaction, the cell walls of yeast cells polysaccharides and proteins are decomposed, and such sugars as glucose, mannose, galactose, ribose, etc., various palatable amino acids such as glutamic acid and alanine principally, and lower and medium peptides are thereby formed. On the other hand, various vitamins, amino acids, nucleic acid-related substances, organic acids and phosphoric acid compounds contained in the yeast cells or culture liquor are utilized as soluble components. When the yeast is decomposed by *Coprinus macrorhizus* f. *microsporus*, more than 90% of the yeast cells is solubilized and recovered as yeast extract. Further, in the decomposition products, no bitter-tasting substance is formed. It is possible to increase the amount of amino acids formed, by adding a commercially available protease preparation thereto after the decomposition by said cell lytic enzyme.

The thus-obtained decomposition liquor is filtered and the filtrate may be adjusted to the desired taste and flavor by treatment with activated carbon, ion exchange resin or nonioic exchange resin. On the other hand, the taste and flavor of the decomposition liquor can be also adjusted by adding various amino acids and organic acids such as 5'-nucleotides and sodium glutamate thereto.

Then, the pH of the decomposition filtrate is adjusted to 5–6.5 and reaction is carried out by heating the filtrate at 40–85° C. to promote reaction between the sugars and amino acids formed by decomposition, whereby aging is effected. The seasoning liquor which has been aged is used as yeast extract as is, or a paste of yeast extract is obtained by concentration or a powdered yeast extract is prepared by spray drying.

As explained above, by using the novel cell lytic enzyme, the present invention permits a number of simultaneous advantages, and therefore provides a very useful method. For example, yeast extract can be prepared in high yield from the yeast; good seasoning agents can be obtained from dry yeasts such as petroleum fermentation yeast, sulfite pulp yeast etc.; no substances having bitter taste are formed during the decomposition; and the salt content of the yeast extract is low.

The present invention is hereunder explained in detail, referring to specific examples:

EXAMPLE 1

*Coprinus macrorhizus* f. *microsporus* (ATCC 20120) was cultured under aeration with stirring at 28° C. for 48 hours in 20 l. or a medium consisting of 3% sucrose, 3% of distillers solubles, 0.5% of yeast cells, 0.02% of magnesium sulfate and 0.5% of potassium primary phosphate (pH 6.0), the cells were filtered off, and a filtrate was obtained. Precipitates obtained by adding acetone to the filtrate to give 75% acetone (volume/volume) were freeze-dried, whereby 170 g. of crude enzyme was obtained.

In a separate vessel, 80 l. of a suspension of sulfite pulp waste liquor yeast, *Candida utilis*, having a 10% concentration and a pH adjusted to 8.5 was heat-treated at 100° C. for 10 minutes, and then cooled and adjusted to 55° C. A quantity of 17 g. of crude cell lytic enzyme was added thereto and decomposition was conducted at 55° C. with stirring for 10 hours. The cells were decomposed in that decomposition step, and sugars, amino acids, peptides, etc., were liberated. After the decomposition liquor was adjusted to a pH of 6.0 with hydrochloric acid, 62 l. of separated liquor was obtained by centrifugal separation. Total solid content of the separated liquor was 118 g./l., and thus more than 90% of the raw material yeast was deemed to be solubilized. The liquor was heated at 60° C. for 2 hours, then concentrated to give 8.8 kg. of yeast extract in a paste state. General analytical values of the thus obtained seasoning agent were 7.9% total nitrogen, 4.4% sodium glutamate, 8.2% total sugars, 14.3% ash, 2.8% sodium chloride and 16% water.

A palatability test of a 2% aqueous solution of the present yeast extract was conducted by a staff panel of 5 members of Tokyo Research Laboratory of Kyowa Hakko Kogyo Co., Ltd. according to the profile method, and as a result no bitter taste was observed, but a thick, good taste was felt, a meat-like taste and flavor and a good body were recognized, and other good evaluations were given by all panel members.

EXAMPLE 2

18 l. of filtrate was obtained by filtering a culture liquor of *Coprinus macrorhizus* f. *microsporus* cultured in essentially the same manner as in Example 1.

In a separate vessel, 82 l. of water and 18 l. of said culture filtrate of cell lytic enzyme were added to 10 kg. of dry yeast cells obtained by culturing a yeast belonging to the genus Candida using normal paraffins as a carbon source and washing them with hexane and water. The pH was adjusted to 8.5 with caustic soda, and the yeast cells were decomposed at 55° C. with stirring for 8 hours. Then, the pH of the decomposition liquor was adjusted to 6.0 with hydrochloric acid, and 80 l. of separated liquor was obtained by centrifugal separation. A quantity of 400 g. of activated carbon sold under the trademark Taiko-zinc chloride carbon SA by Futamura Kagaku Kogyo Co., Ltd. was added to the liquor and stirred at 60° C. for one hour, and then filtered. An amount of 100 g. of sodium 5'-inosinate was added and the filtrate was dried in a spray drier, whereby 10.2 kg. of light yellow powder was obtained.

The general analytical values of the product seasoning agent were 4% water, 2.5% sodium chloride, 8.1% total nitrogen, 5.1% sodium glutamate and 17.5% ash, and no bitter taste, disagreeable taste or oil smell whatsoever were observed.

EXAMPLE 3

*Daedaleopsis styracina* (ATCC 20188) was cultured under aeration with stirring for 72 hours in 20 l. of a medium consisting of 3% of sucrose, 3% of distillers solubles, 0.3% of yeast extract, 0.04% of magnesium sulfate and 0.5% of potassium primary phosphate (pH 4.5), the cells were filtered off and subjected to acetone dehydration according to the conventional method, whereby 400 g. of dry cells were obtained.

In a separate vessel, 50 l. of 8% yeast suspension (dry basis) was adjusted to pH 3.0, heat-treated at 100° C. for 10 minutes and then cooled. The entire amount of the so-obtained dry cells of *Daedaleopsis styracina* was added to the suspension and the decomposition was carried out at 45° C. for 5 hours to dissolve the yeast cells. The pH was then adjusted to 7.2 with caustic soda, and then 8 g. of the protease enzyme sold under the trademark Prozyme by Kyowa Hakko Kogyo Co., was added and decomposition was carried out at 48° C. for three hours to form a large quantity of amino acids. Then, the pH was adjusted to 6.0 with hydrochloric acid, and 38 l. of separated liquor was obtaned by centrifugal separation. The total solids present in the product liquor was 95 g./l., and 90% of the yeast cells was deemed to be solubilized. From this liquor, 20 l. of a liquid seasoning agent was obtained by concentrating under reduced pressure.

EXAMPLE 4

*Irpex lacteus* (ATCC 20123) was cultured under aeration with stirring for 72 hours in 20 l. of a medium consisting of 3% of sucrose, 3% of distillers solubles, 0.5% of yeast cells, 0.05% of magnesium sulfate and 0.6% of potassium primary phosphate (pH 5.0), the cells were filtered off, and a precipitate was obtained by adding 65% (weight/volume) of ammonium sulfate to the filtrate. The precipitate were dissolved in water and subjected to electrodialysis, and 19 g. of crude enzyme was obtained by freeze-drying.

In a separate vessel, a yeast fermentation liquor was obtained by culturing *Saccharomyces cerevisiae* at 28° C. for 30 hours in 200 l. of a medium consisting of 5% of glucose, 0.5% of peptone, 0.5% of yeast extract, 0.15% of potassium secondary phosphate, 0.02% of magnesium sulfate and 0.2% of calcium carbonate (pH 6.0). The resulting culture liquor was heat-treated at 95° C. for 15 minutes, and then cooled. The pH was adjusted to 3.0 with hydrochloric acid. The entire amount of the crude enzyme was added thereto and the cells were decomposed at 50° C. for 10 hours. The pH was then adjusted to 5.8 with caustic soda, and 185 l. of separated liquor was obtained by centrifugal separation. The resulting liquor contained various organic acids and nucleic acid-related substances formed by the yeast together with the decomposition product of the yeast. An amount of 9 kg. of activated carbon sold under the trademark Taiko-zinc chloride carbon SA by Futamura Kagaku Kogyo Co., Ltd. was added to 185 l. of the separated liquor, stirred at 60° C. for one hour, and then filtered, whereby a filtrate was obtained. A quantity of 2 kg. of sodium glutamate was added to the filtrate and 27 kg. of a seasoning agent in a paste state was obtained by concentration under reduced pressure.

EXAMPLE 5

18 l. of filtrate was obtained by filtering a culture liquor of *Coprinus radians* (ATCC 20014) and *Coprinus micaceus* (ATCC 20122) cultured in essentially the same manner as in Example 1.

In a separate vessel, 82 l. of water and 18 l. of said culture filtrate of cell lytic enzyme were added to 10 kg. of dry yeast cells obtained by culturing a yeast belonging to the genus Candida using normal paraffins as a carbon source and washing them with hexane and water. The pH was adjusted to 8.5 with caustic soda, and the yeast cells were decomposed at 55° C. with stirring for 8 hours. Then, the pH of the decomposition liquor was adjusted to 6.0 with hydrochloric acid, and 80 l. of separated liquor was obtained by centrifugal separation.

A quantity of 400 g. of activated carbon sold under the trademark Taiko-zinc chloride carbon SA by Futamura Kagaku Kogyo Co., Ltd. was added to the liquor and stirred at 60° C. for one hour, and then filtered. An amount of 100 g. of sodium 5'-inosinate was added and the filtrate was dried in a spray drier, whereby 9.8 kg. and 10.5 kg. of light yellow powder was obtained.

What is claimed is:

1. A process for producing a seasoning agent having a meat like flavor which comprises decomposing yeast cells with a cell lytic enzyme obtained from culturing a microorganism selected from the group consisting of *Coprinus macrorhizus* f. *microsporus*, *Coprinus radians*, *Coprinus micaceus*, *Daedaleopsis styracina* and *Irpex lacteus* in a nutrient medium, to obtain a decomposition liquor, filtering said liquor, adjusting the filtrate to pH 5 to 6.5 and thereafter heating said filtrate at 40 to 85° C. to effect aging whereby there occurs reaction of sugars and amino acids formed by decomposition to produce said meat-like flavor.

2. Process according to claim 1 wherein said yeast cells are killed by heat treatment prior to said decomposition step.

3. Process according to claim 1 wherein said decomposition liquor is treated with a protease enzyme.

4. Process according to claim 1 wherein said aged filtrate is concentrated to obtain a paste.

5. Process according to claim 1 wherein said aged filtrate is spray dried to obtain a powder.

6. Process according to claim 1 wherein said decomposition step comprises reacting 0.02 to 1.5% of cell lytic enzyme obtained from a microorganism selected from the group consisting of *Coprinus macrorhizus* f. *microsporus*, *Coprinus radians* and *Coprinus micaceus*, with a 5 to 15% yeast cell suspension for 5 to 48 hours at a pH of 8 to 8.5 and a temperature of 50 to 55° C.

7. Process according to claim 1 wherein said decomposition step comprises reacting 0.02 to 2% of cell lytic enzyme obtained from a microorganism selected from the group consisting of *Daedaleopsis styracina* and *Irpex lacteus*, with a 5 to 25% yeast cell suspension for 5 to 48 hours at a pH of 2.5 to 3.0 and temperature of 45 to 50° C.

References Cited

UNITED STATES PATENTS

| 3,627,539 | 12/1971 | Ishii et al. | 99—97 X |
| 3,682,778 | 8/1972 | Kawai et al. | 99—96 |
| 3,178,359 | 4/1965 | Weaver | 195—2 |
| 3,097,145 | 7/1963 | Shimazono et al. | 195—62 |
| 3,480,447 | 11/1969 | Hack et al. | 99—140 R |

FOREIGN PATENTS

| 25,101 | 1898 | Great Britain. |

OTHER REFERENCES

Ozaki et. al., Effects of the Culture Filtrate of Irpex Lactens on the Extraction rate of Protein from Defatted soybean. Chemical Astracts., vol. 65, 1966 (pp. 1344 and 1345a), QDIA51.

Clements et al., The Genera of Fungi, Hafnet Publ. Co., New York 1954 (pp. 157, 163, 164 and 168) QK60306.

DAVID M. NAFF, Primary Examiner

U.S. Cl. X.R.

195—65 66 R; 426—221

UNITED STATES PATENT OFFICE
CERTIFICATE OF CORRECTION

Patent No. 3,809,780                    Dated May 7, 1974

Inventor(s) KENGO ISHIDA, et al.

It is certified that error appears in the above-identified patent and that said Letters Patent are hereby corrected as shown below:

Identify as an inventor:

ATSUSHI YAMAMOTO, Tokyo, Japan

Signed and sealed this 10th day of September 1974.

(SEAL)
Attest:

McCOY M. GIBSON, JR.
Attesting Officer

C. MARSHALL DANN
Commissioner of Patents